US010651715B2

(12) United States Patent
Katada et al.

(10) Patent No.: US 10,651,715 B2
(45) Date of Patent: May 12, 2020

(54) LINEAR VIBRATION MOTOR, AND PORTABLE ELECTRONIC DEVICE PROVIDED WITH SAID LINEAR VIBRATION MOTOR

(71) Applicant: Nidec Copal Corporation, Tokyo (JP)

(72) Inventors: Yoshinori Katada, Tokyo (JP); Shin Odajima, Tokyo (JP); Shiori Ishii, Tokyo (JP); Noboru Segawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 115 days.

(21) Appl. No.: 15/748,103

(22) PCT Filed: Jul. 27, 2016

(86) PCT No.: PCT/JP2016/071988
§ 371 (c)(1),
(2) Date: Jan. 26, 2018

(87) PCT Pub. No.: WO2017/018442
PCT Pub. Date: Feb. 2, 2017

(65) Prior Publication Data
US 2018/0219465 A1     Aug. 2, 2018

(30) Foreign Application Priority Data

Jul. 29, 2015 (JP) .................................. 2015-149861

(51) Int. Cl.
*H02K 33/02* (2006.01)
*H02K 33/16* (2006.01)
(Continued)

(52) U.S. Cl.
CPC ............ *H02K 33/02* (2013.01); *B06B 1/045* (2013.01); *G06F 3/016* (2013.01); *H02K 33/16* (2013.01); *H04M 1/026* (2013.01); *H04M 1/02* (2013.01)

(58) Field of Classification Search
CPC ................................ H02K 33/02; H02K 33/16
(Continued)

(56) References Cited

U.S. PATENT DOCUMENTS 8,207,641 B2 *  6/2012  Horng ..................... F16C 17/02
                                                                310/67 R
2005/0244290 A1 * 11/2005  Inagaki ................. F04B 35/045
                                                                417/416
(Continued)

FOREIGN PATENT DOCUMENTS

JP         2005-94832 A       4/2005
JP         2011-97747 A       5/2011
(Continued)

OTHER PUBLICATIONS

International Search Report dated Oct. 11, 2016 during the prosecution of in International Application No. PCT/JP2016/0710988.

*Primary Examiner* — Terrance L Kenerly
(74) *Attorney, Agent, or Firm* — Troutman Sanders LLP (57) ABSTRACT

The object of the present invention is to shorten the dimension in the axial direction to achieve compactness. The present invention has a movable element integrally provided with a magnet portion, weight portions, and shafts; a frame accommodating the movable element and enabling reciprocating motion thereof along a axial direction; a coil secured to the frame and drives the magnet portion along the axial direction; and elastic members exerting, on the movable element, elastic forces repelling the driving forces that act on the magnet portion. The shafts each extend toward a side along the axial direction. Tip ends of the shafts are configured as free ends. Bearings slidably supporting the shafts are secured to the frame. The weight portions have recessed portions that are formed along the axial direction. The shafts and the bearings are disposed in the spaces within the recessed portions.

6 Claims, 4 Drawing Sheets

(51) Int. Cl.
*H04M 1/02* (2006.01)
*B06B 1/04* (2006.01)
*G06F 3/01* (2006.01)

(58) Field of Classification Search
USPC .......................................................... 310/90
See application file for complete search history.

(56) References Cited

U.S. PATENT DOCUMENTS

| | | | | |
|---|---|---|---|---|
| 2007/0040457 | A1* | 2/2007 | Shimizu | A61C 17/3445 310/15 |
| 2013/0169071 | A1* | 7/2013 | Endo | H02K 33/02 310/25 |
| 2017/0070131 | A1* | 3/2017 | Degner | H02K 35/00 |
| 2017/0214306 | A1* | 7/2017 | Katada | B06B 1/045 |
| 2017/0288523 | A1* | 10/2017 | Katada | H02K 33/16 |

FOREIGN PATENT DOCUMENTS

| | | | |
|---|---|---|---|
| JP | 2012-16153 A | 1/2012 | |
| JP | 2012-213710 A | 11/2012 | |

* cited by examiner

LINEAR VIBRATION MOTOR, AND PORTABLE ELECTRONIC DEVICE PROVIDED WITH SAID LINEAR VIBRATION MOTOR

CROSS-REFERENCE TO RELATED APPLICATIONS

This is a U.S. national phase application under 35 U.S.C. § 371 of International Patent Application No. PCT/JP2016/071988, filed Jul. 27, 2016, and claims benefit of priority to Japanese Patent Application No. 2015-149861, filed Jul. 29, 2015. The entire contents of these applications are hereby incorporated by reference.

FIELD OF TECHNOLOGY

The present invention relates to a linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various types of vibration motors under development, linear vibration motors that are able to generate relatively large vibrations through linearly reciprocating vibrations are of particular interest. This linear vibration motor provided with a straight stationary shaft, and a movable element is vibrated therealong, making it possible to achieve stabilized vibration, and making it possible to achieve resistance to damage, such as when there is a drop impact, through the movable element being held by the stationary shaft.

In the prior art for linear vibration motors equipped with stationary shafts, there have been proposals for one wherein a weight and a magnet are disposed on a movable element side, wherein an electric current is applied to a coil that is provided on the stator side to apply a driving force (a Lorentz force) to a magnet, wherein a through hole is formed through the movable element in the vibration direction and a single stationary shaft passes through the through hole (referencing Japanese Unexamined Patent Application Publication 2012-16153, below), and one wherein two stationary shafts are provided along the vibration direction, and a coil and a magnet are provided between the stationary shafts, where the movable element is supported slidably by the two stationary shafts (referencing Japanese Unexamined Patent Application Publication 2011-97747, below), and the like.

SUMMARY

With smaller and thinner mobile electronic devices and wearable electronic devices there is the need for smaller and thinner vibration motors to be equipped therein. In particular, in electronic devices that are provided with flat-panel display portions, such as smartphones, the space within the device in the direction of thickness, which is perpendicular to the display panel, is limited, and thus there is a strong need for the vibration motor, which is equipped therein, to be thinner.

When one considers reducing the thickness of a linear vibration motor that is provided with a stationary shaft, in the first of the prior art technologies, a through hole of an adequate size to prevent interference is formed along the direction of vibration in a movable element wherein a weight portion is connected to a magnet along the direction of vibration, and thus a through hole is formed in the magnet itself, requiring the magnet to be adequately thick, in respect to the diameter of the stationary shaft, in order to secure an adequate volume for the magnet, to thereby produce the desired driving force.

If two stationary shafts are provided and a coil and a magnet are provided therebetween, as in the latter of the prior art technologies described above, it would not be necessary to form a through hole through the magnet, thus enabling the magnet to be made thinner. However, because two stationary shafts are provided, on both sides of the magnet, a problem is produced in that the width of the linear vibration motor is wide. In recent years there have been requests for linear vibration motors that are to be installed in miniaturized electronic devices to be more compact, not only in the thickness direction, but in the width direction as well.

In contrast, one may consider dividing the shaft and laying it out and securing it on both sides of the magnet in the axial direction, and mounting the weight portion as rings on the individual divided shafts, with the tip ends of the individual shafts, which protrude from the weight portions, supported by the bearings on the stationary element side, where these magnets, the pair of shafts, and the weight portions are vibrated together. In this case, the shaft does not pass through the magnet, making possible to eliminate the reduction in volume of the magnet caused by the through hole.

However, in such a structure there is the need to secure space in the axial direction between the weight portions and the bearings so as to not have interference between the weight portions and the bearings on the stationary element side, which may increase the overall length in the axial direction.

In the present invention, the handling of such problems is an example of the problem to be solved. The object of the present invention is to reduce the size through shortening the dimension in the axial direction in particular, and further to provide a shaft on the movable element side, to secure an adequate volume for the magnet in order to obtain a desired driving force, and so forth.

In order to achieve such an object, the linear vibration motor of the present invention is equipped with the following structures:

A linear vibration motor comprising: a movable element that has, integrally, a magnet portion, a weight portion, and a shaft; a frame for containing the movable element so as to enable reciprocating motion along an axial direction; a coil for driving, along the axial direction, the magnet portion, which is secured to the frame; and an elastic member for applying, to the movable element, an elastic force for repelling a driving force that is applied to the magnet portion, wherein: the shaft is provided extending in one direction along the axial direction, with the tip end thereof as a free end, and a bearing, for supporting the free end of the shaft slidably, is secured to the frame; and the weight portion has a recessed portion that is recessed along the axial direction, wherein the shaft and the bearing are arranged in a space within the recessed portion.

The present invention is structured as explained above, and is thus able to achieve the objects of the present invention, such as reducing the size through shortening the dimension in the axial direction in particular, and further providing a shaft on the movable element side, to secure an adequate volume for the magnet in order to obtain a desired driving force, and so forth.

DETAILED DESCRIPTION

Figure 1:
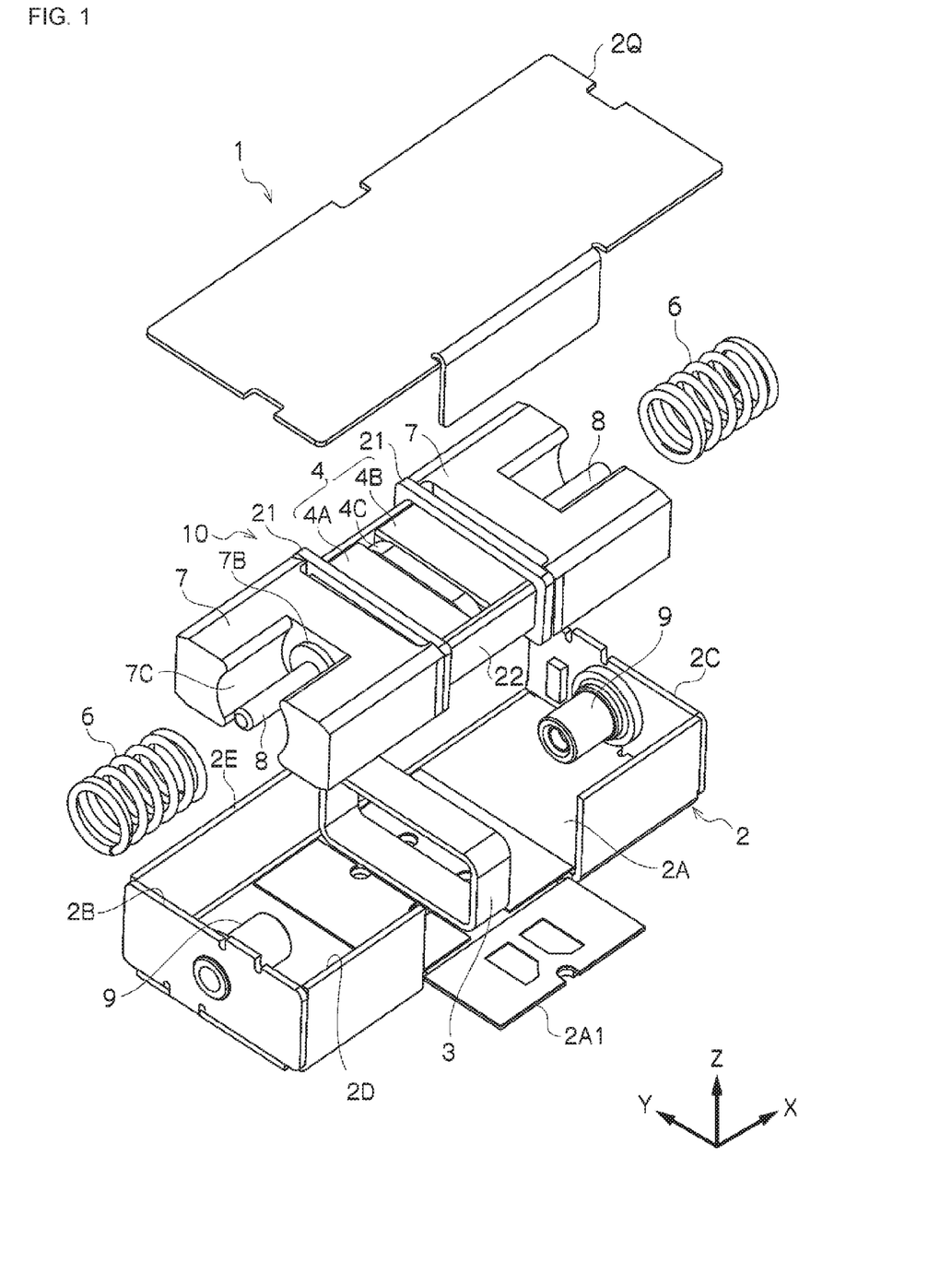
FIG. 1 is an explanatory diagram (an assembly perspective diagram) illustrating a linear vibration motor according to an embodiment according to the present invention.
Figure 2:
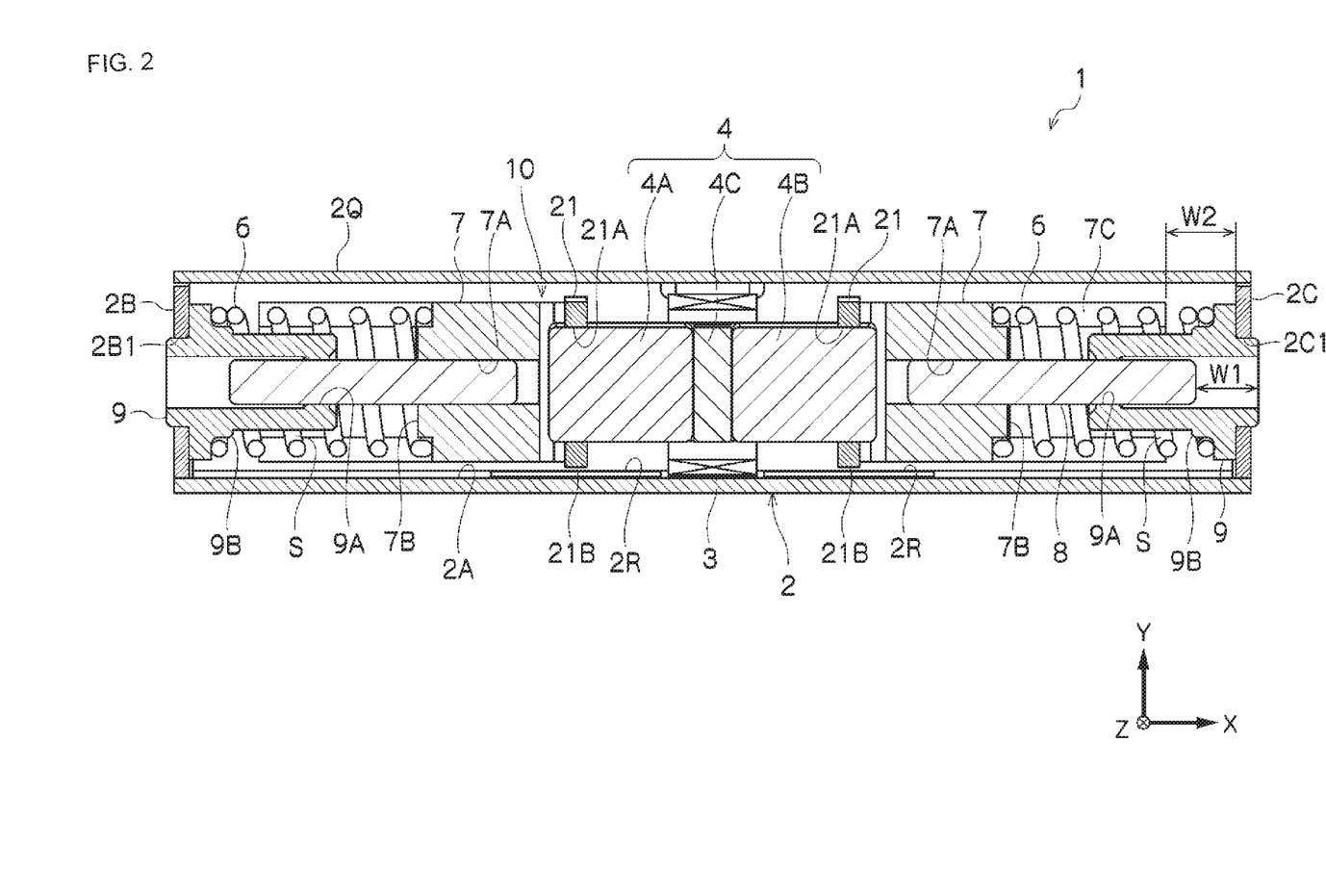
FIG. 2 is an explanatory diagram (a cross-sectional view, cut at a vertical plane along the center axial line) illustrating a linear vibration motor according to an embodiment according to the present invention.
Figure 3:
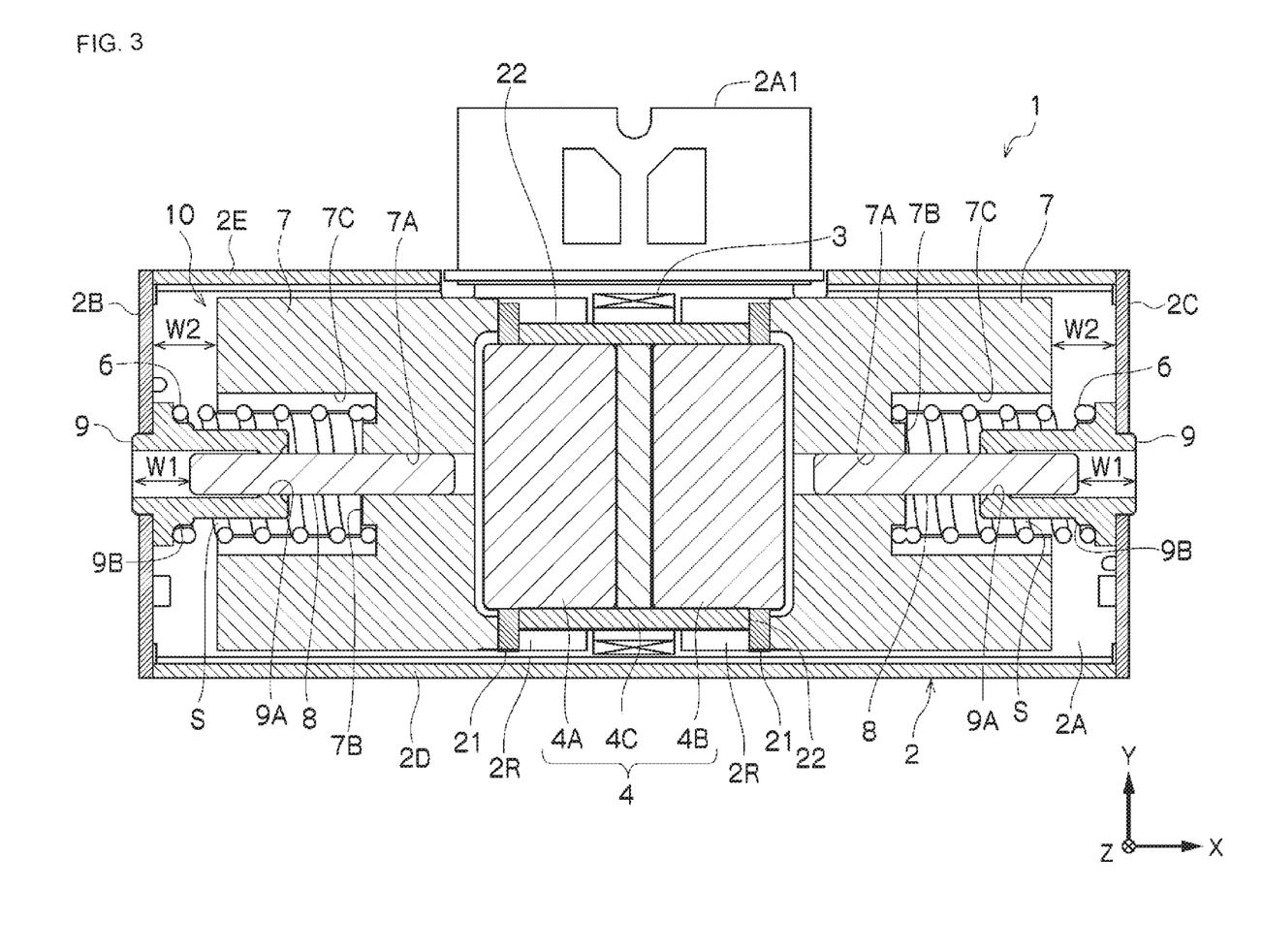
FIG. 3 is an explanatory diagram (a cross-sectional view, cut at a horizontal plane along the center axial line) illustrating a linear vibration motor according to an embodiment according to the present invention.

An embodiment according to the present invention will be explained below in reference to the drawings (where in different drawings below, identical reference symbols indicate identical positions, and redundant explanations in the individual drawings are omitted.) FIG. 1 through FIG. 3 illustrate the overall structure of a linear vibration motor according to one embodiment according to the present invention. The X direction in each of the drawings indicates the direction of vibration (the axial direction), the Y direction indicates the width direction, and the Z direction indicates the thickness (height) direction.

The linear vibration motor 1 comprises: a movable element 10 that is equipped integrally with a magnet portion 4, a weight portion 7, and a shaft 8; a frame 2 for enclosing the movable element 10 so as to enable reciprocating motion along one axial direction; a coil 3 that is secured to the frame 2, for driving the magnet portion 4 along the one axial direction; and an elastic member 6 for applying, to the movable element 10, an elastic force for repelling the driving force that acts on the magnet portion 4. In the movable element 10, weight portions 7 are connected through respective connecting pieces 21 to one side and the other side, in the axial direction, of a magnet portion 4, and one end side of a shaft 8, on the centroid axis of the weight portion 7, is inserted and connected to each (referencing FIG. 2 and FIG. 3). The other end side of the shaft 8 serves as a free end (referencing FIG. 1 and FIG. 2).

In the magnet portion 4, flat rectangular magnet pieces 4A and 4B that have polarities along the axial direction (the X direction in the figure) are multiply disposed with identical poles facing each other, connected with a spacer yoke 4C interposed therebetween. Reinforcing pieces 22 are secured to the magnet portion 4, and the rigidity of the magnet portion 4 is increased thereby.

The connecting pieces 21 are rectangular ring-shaped members that fit together with respective end sides of the magnet portion 4. Each connecting piece 21 has a rectangular through hole 21A formed toward the center of a rectangular plate material, where an end portion side of the magnet portion 4 is inserted and fitted in the through hole 21A. This connecting piece 21 is formed from a nonmagnetic metal material with relatively high rigidity such as, for example, nonmagnetic stainless steel, or the like.

In each connecting piece 21, on both end sides of the movable element 10 in the width direction (the Y direction in the figure), the face on the shaft 8 side is welded to the weight portion 7 and the face on the opposite side is welded to two reinforcing parts 22.

The end portions on the bottom face side of the frame 2 in the connecting piece 21 protrudes further toward the bottom face side of the frame 2 than the end face of the weight portion 7 on the side in the same direction (referencing FIG. 2). When the movable element 10 is rotated, the protruding part functions as a contacting portion 21B for contacting the slide bearing portion 2R, described below.

The two reinforcing pieces 22 are provided on both sides of the magnet portion 4, in the width direction, so as to hold the magnet portion 4 therebetween. Each reinforcing piece 22 spans the magnet pieces 4A and 4B and the spacer yoke 4C, and is adhesively bonded to the side faces thereof.

Weight portions 7 are connected through connecting pieces 21 to both end portions, in the axial direction (the X direction in the figures) of the magnet portion 4. The weight portion 7 may be structured through, for example, a metal material with a relatively high specific gravity (such as tungsten), and, in the example that is illustrated, is formed in a rectangular cross-sectional shape that has a Z-direction height that is greater than the thickness of the magnet portion 4, and a width in the Y direction that is greater than the width of the magnet portion 4.

A fitting hole 7A into which is inserted and fitted the shaft 8 is provided in the center axis of the weight portion 7 (referencing FIG. 2). The shaft 8 is connected securely through press-fitting and/or welding in the fitting hole 7A. Note that the fitting hole 7A, by way of illustration, is a through hole, but as another example, it may instead be a closed-bottom hole.

A recessed portion 7C is provided in the side of the weight portion 7 in the direction in which the shaft protrudes so as to have an indentation toward the magnet portion 4 side along the axial direction, where a portion of the shaft 8, the elastic member 6, and the bearing 9 are disposed in the space within this recessed portion 7C.

The recessed portion 7C is formed in a recessed shape into which an elastic member 6 can be fitted loosely, where a supporting protrusion 7B that is formed on the bottom face beyond the magnet portion 4 is fitted in the inner peripheral portion of the elastic member 6, to support the elastic member 6.

The frame 2 may have a frame structure that is able to contain the various portions; however, in the example that is illustrated, wall portions 2B, 2C, 2D, and 2E are provided extending from the periphery of a rectangular bottom face 2A. Moreover, the frame 2, as necessary, is provided with a cover plate 2Q for covering that which is contained within the frame 2. The cover plate 2Q is formed in a rectangular plate shape that is attached to the top end faces of the wall portions 2B through 2E. The frame 2 can be formed through machining (pressing processes, etc.) on a metal plate. In the example that is illustrated, the frame 2 has a flat-shaped (flat-shaped) essentially rectangular solid shape (a box shape) wherein the dimension in the direction of thickness (the Z direction in the figure) is less than the dimension in the direction of width (the Y direction in the figure), and the dimension in the direction of vibration (the X direction) in the figure is greater than the dimension in the width direction.

Bearings 9 are secured, so as to support the shafts 8 slidably, to the respective wall portions 2B and 2C (the end wall portions) on both ends of the frame 2. Explaining in detail, fitting holes 2B1 and 2C1 are formed in the wall portions 2B and 2C, passing respectively therethrough. One end side of a bearing 9 is inserted into each of the fitting holes 2B1 and 2C1, and secured through press fitting and/or welding. A shaft 8 is inserted slidably into each bearing 9.

Moreover, two slide bearing portions 2R, corresponding to the positions of the respective connecting pieces 21, are provided above the bottom face 2A of the frame 2.

These slide bearings 2R bear the contacting portions 21B of the connecting pieces 21 when the movable element 10 has rotated around the shaft 8, preventing the weight portions 7 from contacting the inner surface of the frame 2 directly. Because, in the weight portions 7, it is difficult to treat the surfaces to produce low friction, if the weight portions 7 were to slide in contact with the inner surface of the frame 2, it could cause a large sliding load, and could also increase the amount of noise produced. However, in the present embodiment the contacting portions 21B of the connecting pieces 21, which can be treated easily so as to be slippery, slide on the slide bearing portions 2R, enabling the movable element 10 to vibrate smoothly and quietly, and also enabling the service life of the linear vibration motor 1 to be extended substantially.

The bearing 9 is an essentially cylindrical slide bearing, and is disposed coaxially with the shaft 8, with the base end side secured to the end wall portion (the wall portion 2C) of the frame 2, with the other end side protruding toward the inside of the frame 2, and inserted into the recessed portion 7C of the weight portion 7.

A ring-shaped support protruding portion 9A, for supporting, through making sliding contact with the outer peripheral surface, the shaft 8, is provided on the inner peripheral surface of the bearing 9. This supporting protruding portion 9A is provided toward the protruding end side of the bearing 9 so as to be positioned within the recessed portion 7C of the weight portion 7.

Moreover, an elastic member 6, which is a compressed coil spring, is installed in a ring shape on the outer peripheral portion of the bearing 9.

This elastic member 6 is provided coaxially in relation to the shaft 8 in a ring shape, with an end portion on one side thereof in contact with the bearing 9 and the end portion on the other side thereof in contact with the bottom within the recessed portion 7C of the weight portion 7, to produce a repulsive force between the bearing 9 and the weight portion 7.

The bearing 9 has a ring shape engaging protruding portion 9B, for contacting and fitting together with the inner peripheral portion of the elastic member 6, on the outer peripheral surface part one side thereof (the base end side), and has a space S between the inner peripheral portion of the elastic member 6 and the outer peripheral surface on the other side, beyond the engaging protruding portion 9B. This space S prevents the inner peripheral portion of the elastic member 6 from making sliding contact with the outer peripheral surface of the bearing 9, so that the elastic member 6 will compress smoothly.

The interior of the bearing 9 is formed into the shape of a through hole, where the spacing W1 between the end portion on one side (the base end side) and the tip end of the shaft 8 in the non-powered state is set so as to be no less than the maximum amplitude W2 of the movable element 10 toward that side. Note that the maximum amplitude W2, in the example that is illustrated, is the dimension between the end portion of the weight portion 7 and the wall portion 2B or 2C (referencing FIG. 3).

The present structure is able to prevent the tip end of the shaft 8 from protruding to the outside from the base end side of the bearing 9 when the movable element 10 vibrates.

In the coil 3, an electric wire is wound along the Y and Z directions around the magnet portion 4 wherein the direction of the magnetic pole faces the X direction, with the top face and/or bottom face of the coil 6 and, if necessary, a side face thereof as well, secured to the inner surface of the frame 2. Securing of the coil 3 to the frame 2 may be through securing directly to the frame 2, or the coil 3 may be wound onto a coil bobbin with the coil bobbin secured to the frame 2.

This coil 3 spans the two magnet pieces 4A and 4B that are adjacent in the axial direction, and is disposed toward the center between these two magnets. Both end portions of the power line that structures the coil 3 are connected electrically to terminals of a single inputting portion 2A1 that is exposed to the outside of the frame 2.

In the operation for installing the movable element 10 into the coil 3, part of the magnet portion 4 is inserted into the coil 3 in a state wherein the connecting piece 21, the weight portion 7, and the shaft 8 of one side are disassembled from the movable element 10, after which a connecting piece 21 is connected to the end portion on one end side of the two reinforcing pieces 22, and the weight portion 7 and the shaft 8 are connected to the connecting piece 29.

The operating effects that are the distinctive feature of the linear vibration motor 1 with the structure set forth above will be explained in detail next.

When not driven (in an unpowered state), the movable element 10 stands still in the vibration center position wherein the elastic forces of the elastic members 6 are in equilibrium.

When a vibration generating current of a resonant frequency that is determined by the mass of the movable element 10 and the coefficient of elasticity of the elastic members 6 is inputted into the coil 3 through the signal inputting portions 2A1 of the frame 2, driving forces (Lorentz forces) in the axial direction (the X direction in the figure) are produced in the magnet portion 4, where the movable element 10 undergoes stabilized reciprocating vibration along the axial direction through these driving forces and the elastic repelling forces of the elastic members 6.

At the time of this reciprocating vibration, the locations that support the sliding contact between the bearing 9 and the shaft 8 that undergoes reciprocating motion (the support protruding portion 9A, or the like) is positioned in the space within the recessed portion 7C of the weight portion 7. Because of this, in the present embodiment, when compared to the case wherein the supporting location for the sliding contact is outside of the weight portion 7, it is possible to secure a large amplitude even when the total length, including the movable element 10 and the bearings 9, is set so as to be short, which, by extension, enables the size of the linear vibration motor 1 as a whole to be shortened.

Moreover, the shafts 8 are disposed divided and integrated with both sides of the magnet portion 4, making it possible to secure a magnet volume that is adequate for producing the desired driving force, in contrast to, for example, the prior art, wherein the shaft for securing to the frame side is inserted into the magnet portion.

Figure 4:
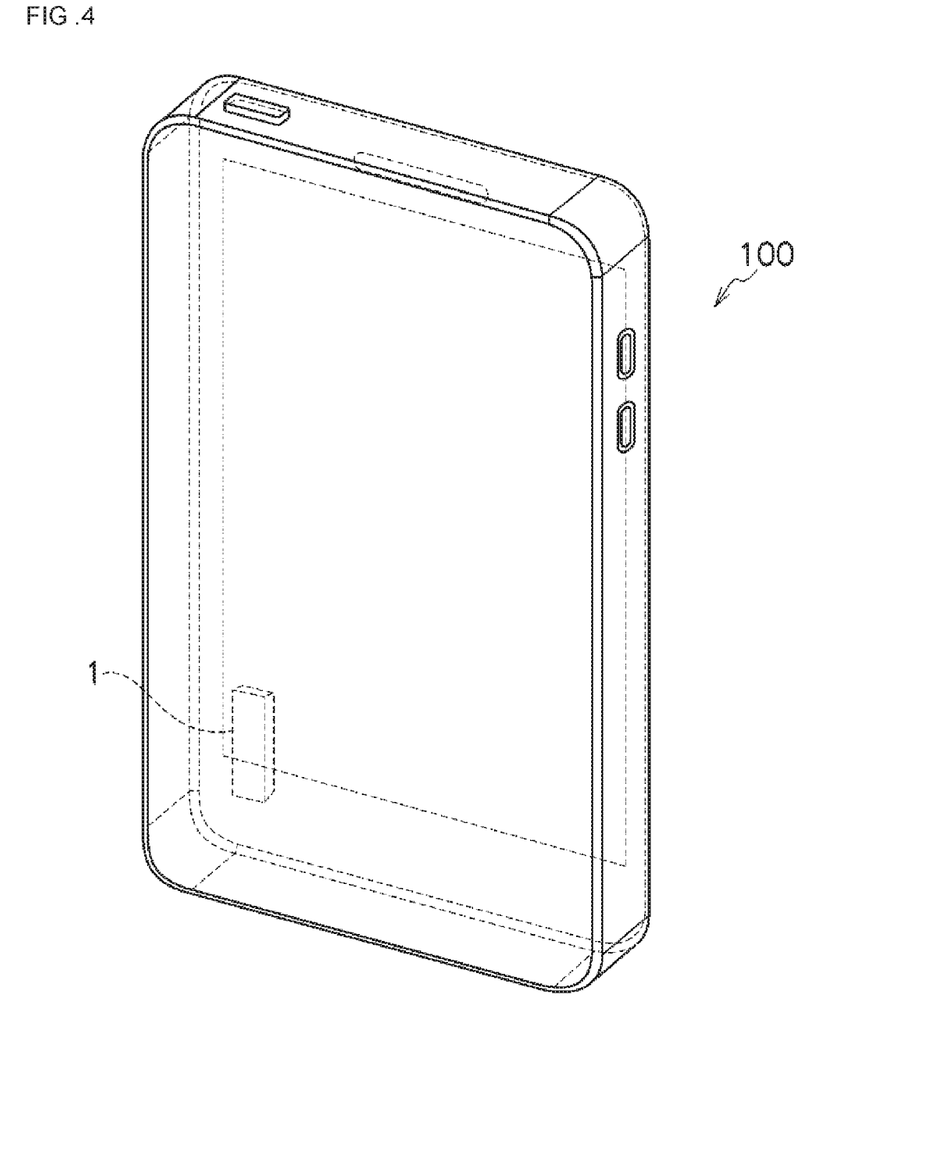
FIG. 4 is an explanatory diagram (a perspective diagram) illustrating a mobile electronic equipped with a linear vibration motor according to an embodiment according to the present invention.

A mobile electronic device 100 that is an example of an electronic device in which is installed a linear vibration motor 1 according to an embodiment according to the present invention will be explained next (referencing FIG. 4).

The mobile electronic device 100 is installed with a linear vibration motor 1 within a case of a thin flat box shape, to structure a mobile information terminal (for example, a smart phone, a tablet personal computer, or the like).

Given this structure it is possible to produce a stabilized vibration through the linear vibration motor 11, and to reduce the thickness and the size, and possible to convey to the user, with good responsiveness, stabilized vibration, which tends not to produce noise, at the beginning or end of an operation such as an incoming call, an alarm function, or the like. Moreover, this makes it possible to produce a mobile electronic device 100 with high mobility and which facilitates design performance, through reducing the thickness of, and making more compact, the linear vibration motor 110. Furthermore, because the linear vibration motor 1 is of a compact shape wherein the various components are contained within a frame 2 of a rectangular shape wherein the thickness is suppressed, it can be mounted, with excellent space efficiency, within a thinner mobile electronic device 100. Moreover, the linear vibration motor 1 has high strength in relation to physical shock and is highly durable, thus making it possible to achieve a mobile electronic device 100 with a long service life and that is resistant to faults.

Note that while in the embodiment set forth above the bearings 9 were secured to the wall portions 2B and 2C of the frame 2 and inserted into the recessed portions 7C of the weight portions 7, as another example, the bearings 9 may be secured to the bottom face 2A of the frame 2, and inserted into the recessed portions 7C of the weight portions 7.

Moreover, in the embodiment set forth above, as a preferred form that demonstrates strikingly the operating effects described above, the magnet portion 4 was structured from two magnet pieces 4A and 4B and a spacer yoke 4C, and a single coil 3 was provided on the periphery of the magnet portion 4; however, as another example, the magnet portion 4 may be structured from three or more magnet pieces, and a plurality of coils 3 may be provided.

Moreover, while, in the embodiment set forth above, a coil spring was used as the elastic member 6 and a single coil spring was provided coaxially with the shaft 8, as a particularly preferred handling, as other examples there is a form wherein an elastic unit, such as a leaf spring, a rubber piece, or the like, is used as the elastic member 6, a form wherein a coil spring, a leaf spring, an elastic unit, and the like are combined as appropriate, a form wherein a plurality of elastic units is provided off-axis from the shaft 8, and so forth, are also possible, where, in these other examples as well, the size can be reduced through disposing the locations of support for the sliding contact between the shafts 8 and the bearings 9 within the recessed portions 7 of the weight portions 7.

Moreover, while, in the embodiment described above, shafts 8 were connected to both end sides of the magnet portion 4 and these two shafts 8 were each supported slidably on respective bearings 9, as a particularly preferred form, instead, as another example, a form is possible wherein a shaft 8 is connected to only one end side of the magnet portion 4 and the single shaft 8 is supported by a bearing 9.

Moreover, as another example, it is possible for the shafts 8, which are divided and disposed on both end sides of the magnet portions 4, to be replaced with a single shaft.

Moreover, while, in the embodiment set forth above, the cross section, in the direction that is perpendicular to the axial direction, of the magnet portion 4, the coil 3, the frame 2, and the like, is formed so as to be rectangular, with the entirety of the linear vibration motor 1 as a whole having the same cross-section, which is rectangular, as a preferred form that is easy to enclose in a mobile electronic device 100 in particular, instead, as another example, the cross-sectional shapes of the various positions and of the linear vibration motor 1 as a whole may instead be of a shape that is other than that of the illustrated examples, such as circular, square, polygonal, or the like.

Moreover, the mobile electronic device 100 of FIG. 6 illustrates a smart phone or a tablet personal computer that is equipped with a linear vibration motor 1, as a preferred example; however, as other examples of the mobile electronic device 100, the structure may be of a mobile telephone, a portable game machine, a watch that is capable of mobile communications, a wearable electronic device such as a wearable communication terminal, or some other portable electronic device that contains a linear vibration motor 1 therein.

The invention claimed is:

1. A linear vibration motor comprising:
   a movable element integrally comprising: a magnet portion, a weight portion, and a shaft;
   a frame containing the movable element so as to enable reciprocating motion along an axial direction;
   a coil driving, along the axial direction, the magnet portion, which is secured to the frame;
   an elastic member applying, to the movable element, an elastic force repelling a driving force applied to the magnet portion; and
   a bearing secured to the frame, wherein:
   the shaft is provided extending in one direction along the axial direction, with a tip end thereof as a free end, and the bearing, slidably supporting the free end of the shaft,
   the weight portion has a recessed portion recessed along the axial direction, wherein the shaft and the bearing are arranged in a space within the recessed portion,
   the bearing is formed in a cylindrical shape, and is secured to an end wall portion of the frame facing the shaft, and the shaft is inserted to be supported therein, and
   the bearing comprises an interior formed in a through hole shape, wherein the spacing between the tip end of the shaft on one side thereof and the end wall portion of the frame is no less than a maximum amplitude of a one side of the movable element, in an unpowered state.

2. The linear vibration motor as set forth in claim 1, further comprising:
   a support protruding portion supporting the outer peripheral surface through the sliding contact on the outer peripheral surface of the shaft is provided in the inner peripheral surface of the bearing, and the support protruding portion is disposed within the recessed portion.

3. The linear vibration motor as set forth in claim 1, wherein:
   the elastic member comprises a coil spring shape, is installed in a ring shape on the outer peripheral portion of the bearing, and, in the elastic member, one end portion engages with the bearing and the end portion on the opposite side engages with the weight portion.

4. The linear vibration motor as set forth in claim 3, wherein:
   the bearing comprises an engaging protruding portion, contacting and fitting with the inner peripheral portion of the elastic member, on the outer peripheral surface on one side thereof, and comprises a space between the inner peripheral portion of the elastic member and the outer peripheral portion on the other side beyond the engaging protruding portion.

5. The mobile information terminal comprising a linear vibration motor as set forth in claim 1.

6. The linear vibration motor as set forth in claim 1, wherein the maximum amplitude is the distance between the one side of the movable element and the end wall portion of the frame.

\* \* \* \* \*